Figure 1:
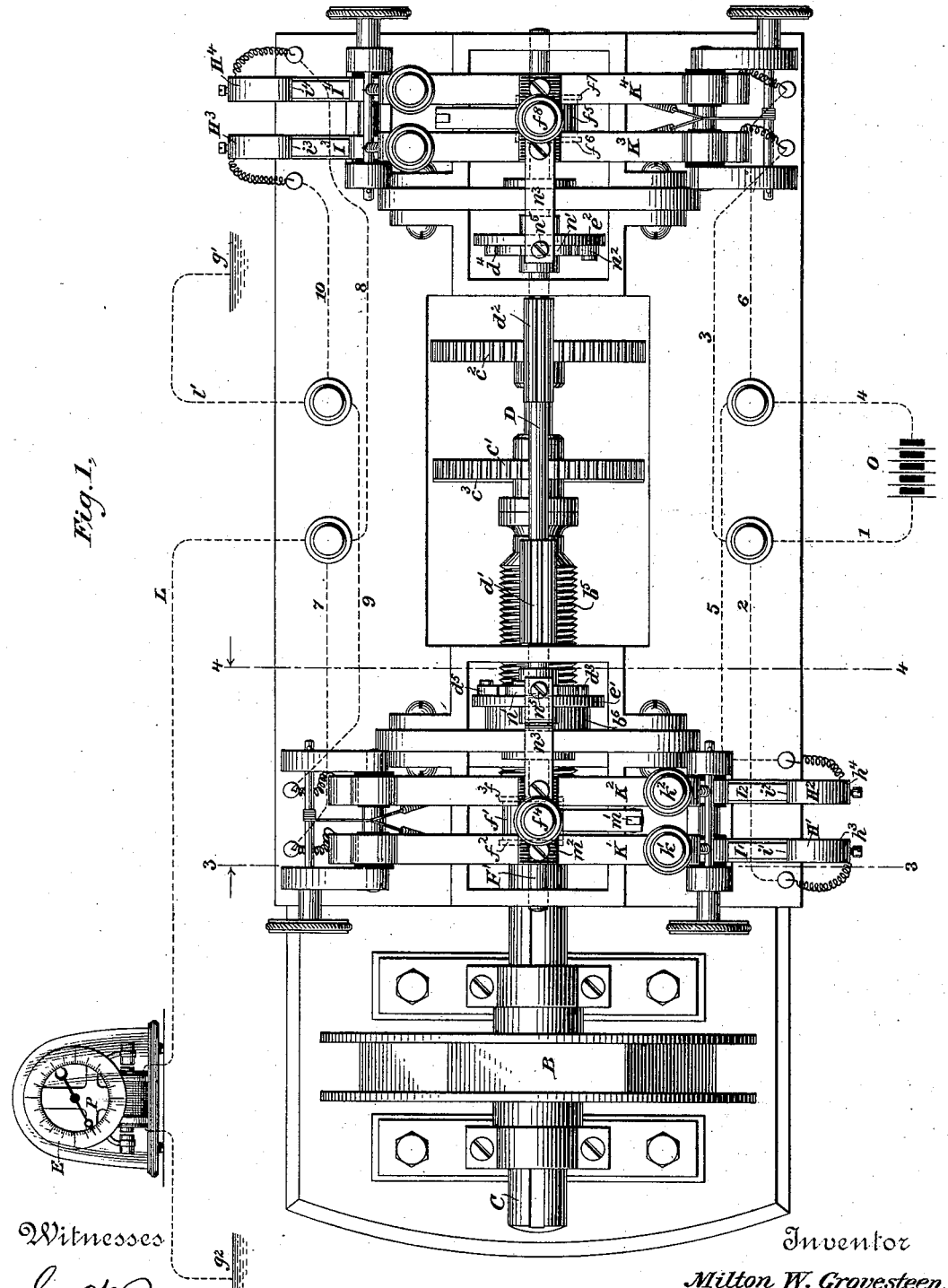

(No Model.) 5 Sheets—Sheet 1.
M. W. GROVESTEEN.
ELECTRIC INDICATING APPARATUS.

No. 322,818. Patented July 21, 1885.

Witnesses
Geo. W. Breck
Caroline E. Davidson

Inventor
Milton W. Grovesteen.
By his Attorneys
Pope & Edgecomb (No Model.) 5 Sheets—Sheet 2.
M. W. GROVESTEEN.
ELECTRIC INDICATING APPARATUS.
No. 322,818. Patented July 21, 1885.
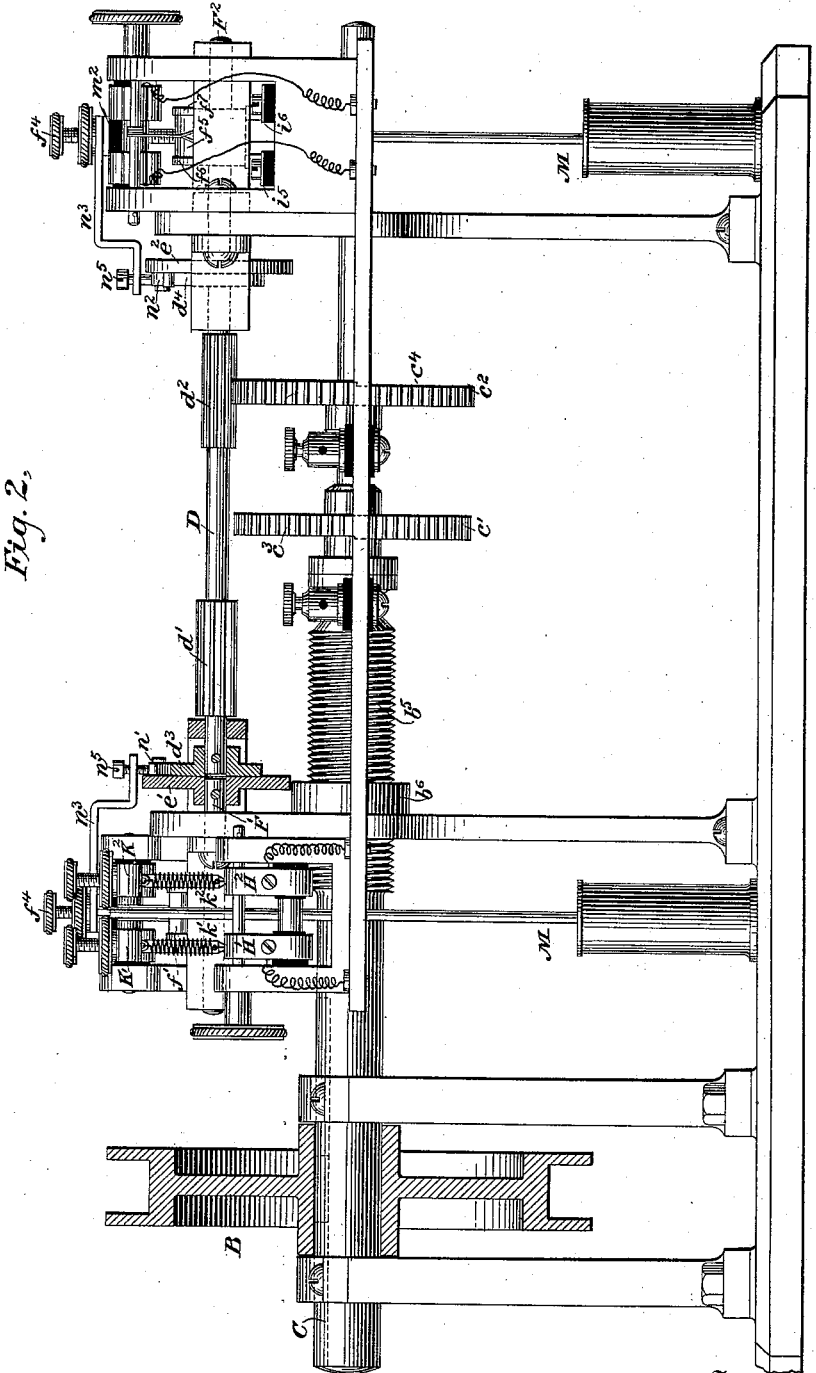
Witnesses
Geo. W. Breck
Caroline E. Davidson
Inventor
Milton W. Grovesteen,
By his Attorneys
Pope & Edgcomb (No Model.)  5 Sheets—Sheet 3.
M. W. GROVESTEEN.
ELECTRIC INDICATING APPARATUS.
No. 322,818.  Patented July 21, 1885.
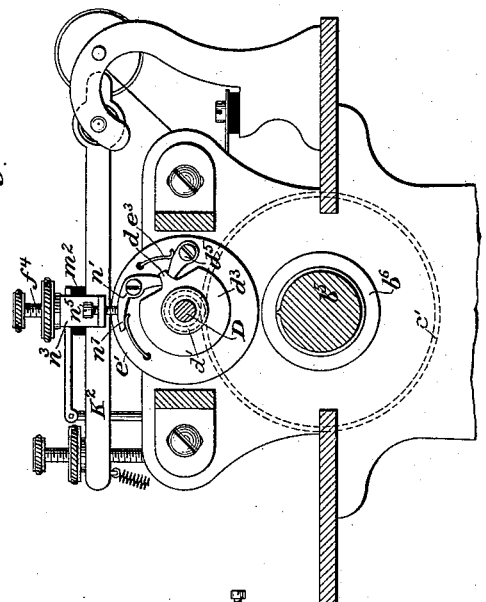
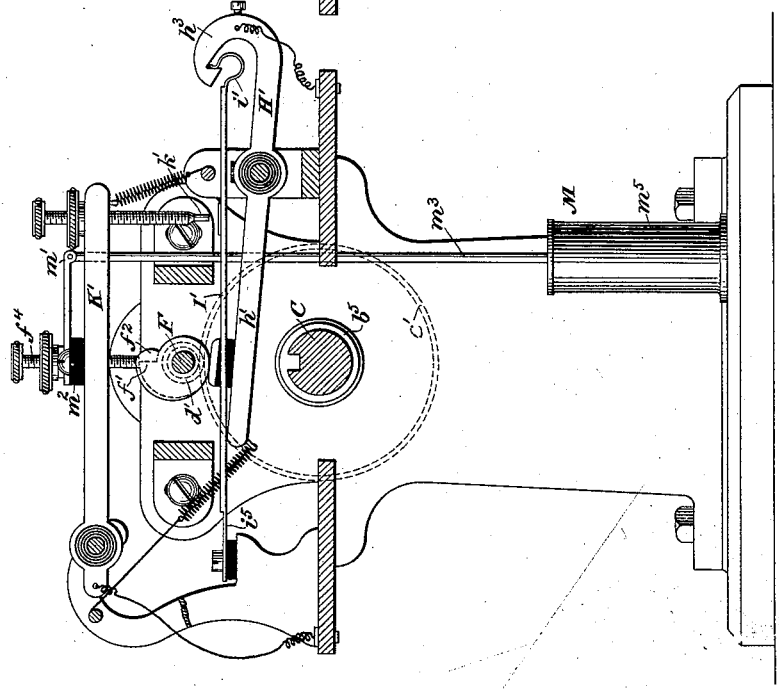
Witnesses
Geo. W. Breck.
Caroline E. Davidson
Inventor
Milton W. Grovesteen.
By his Attorneys
Pope & Edgecomb (No Model.) 5 Sheets—Sheet 4.
M. W. GROVESTEEN.
ELECTRIC INDICATING APPARATUS.

No. 322,818. Patented July 21, 1885.

Witnesses
Geo. W. Breck.
Caroline E. Davidson

Inventor
Milton W. Grovesteen,
By his Attorneys
Pope & Edgecomb (No Model.)
M. W. GROVESTEEN.
ELECTRIC INDICATING APPARATUS.
No. 322,818. Patented July 21, 1885.
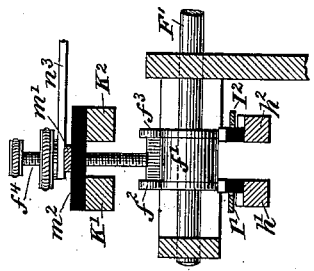
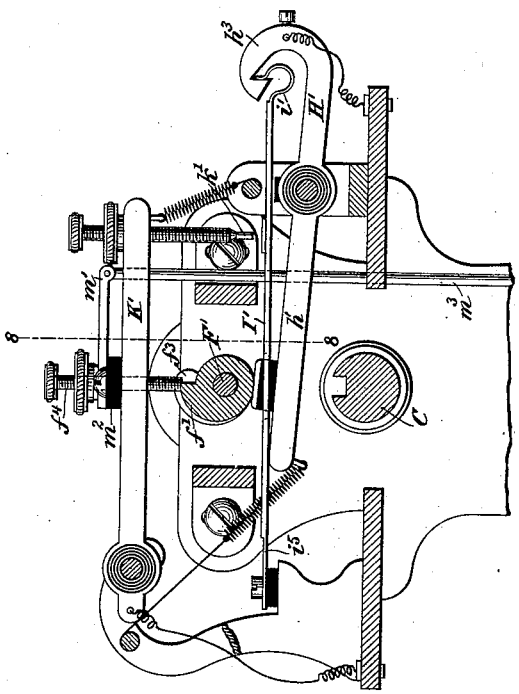
Witnesses
Geo. W. Breck
Carrie E. Ashley
Inventor
Milton W. Grovesteen.
By his Attorneys
Pope & Edgecomb

UNITED STATES PATENT OFFICE.

MILTON W. GROVESTEEN, OF NEW YORK, N. Y.

ELECTRIC INDICATING APPARATUS.

SPECIFICATION forming part of Letters Patent No. 322,818, dated July 21, 1885.

Application filed March 11, 1885. (No model.)

*To all whom it may concern:*

Be it known that I, MILTON W. GROVESTEEN, a citizen of the United States, residing in New York, in the county and State of New York, have invented certain new and useful Improvements in Electric Indicating Apparatus, of which the following is a specification.

My invention relates to the class of apparatus employed for indicating or measuring the variations in the quantities of fluids or gases contained in reservoirs or holders, and for indicating variations in pressure, temperature, or other forces.

The object of the invention is to provide convenient and efficient means for indicating the movements of any required device in either of two directions, and such device may be actuated by any of the varying forces or quantities which it is desired to measure.

Numerous means have been devised for purposes similar to the above; but the majority of these instruments have proved deficient because of the difficulty encountered in providing means for preventing slight variations— that is to say, those having less amplitude than the degrees which they are constructed to measure—from producing an erroneous record.

This invention is designed especially to overcome such difficulties and to provide a reliable and accurate instrument.

This invention is designed especially to be employed in connection with gas-holders for measuring and indicating at a central office the quantity of gas at any time contained by any number of holders located at distant points. At the same time the invention is applicable to other purposes, such as have been suggested. In describing the invention, however, reference will be had to a gas-holder.

The invention consists generally in organizing the apparatus substantially as follows: The gas-holder, which rises and falls accordingly as gas is supplied thereto or drawn therefrom, is constructed to revolve a small shaft in a corresponding direction. This shaft communicates its motion to a suitable counter-shaft, employed for operating peculiar circuit-controlling devices.

As the tanks are usually constructed of different sections, which have different capacities per foot, it is necessary that means be provided for operating the circuit-controlling devices in a manner dependent upon the position of the holder. Thus, if the two lower sections are constructed of nearly equal diameters, and thus to contain approximately the same quantities, then the movements of the circuit-closers may be the same while the gas is contained in these sections; but when the holder has descended so that the third or upper section only contains gas, and, as is usually the case, this is considerably less in diameter than the first section, then it is necessary that a correspondingly less number of registering currents be transmitted for a given rise or fall of the holder. The shaft, however, will be operated with the same rapidity by a given movement of the holder while the gas is being drawn from or supplied to this section, and yet it is desired to actuate the circuit-controlling lever more slowly. To accomplish this the shaft is provided with two or more toothed wheels, which mesh into pinions having a number of teeth, relative to each other, corresponding to the capacities per vertical foot of the different sections. This difference may be secured by varying the number of the teeth either of the gear-wheels or of the pinions. The two lower sections, however, usually differ from each other so little that they may be regarded as the same. While the gas is being drawn from or supplied to either of the lower sections, the gear-wheel and its pinion which produce the more rapid movement of the circuit-closer for a given movement of the holder engage each other. The circuit-closer will then be operated a greater number of times than when the upper section is furnishing the supply or being filled. In this latter case the second gear-wheel meshes with the second pinion, and the circuit-closer is operated.

It will be understood that the movements of the circuit-closer are intended to record, by transmitting electric impulses, the number of feet of gas contained in the reservoir or holder.

The circuit-controlling devices are operated by suitable cams moved by the counter-shaft. When the gas is being withdrawn from the holder the counter-shaft is revolving in a given direction, and for each predetermined movement of the same a given number of impulses will be transmitted to the receiving-instrument in a given direction. When the gas is being supplied to the holder then the counter-shaft will be revolved in the opposite direction, and electrical impulses will be transmitted through the same circuit, but in the opposite direction.

The details of the construction of the circuit-controlling devices will be better understood by referring to the drawings, it being merely stated here that means are provided for preventing any slight reverse movement of the counter-shaft, which may occur immediately after a registering-impulse has been transmitted, from placing the circuit-controlling apparatus in such position as to repeat such impulse and to thereby again actuate the indicating device, thus causing the latter to indicate a degree higher or lower than is correct.

The invention also involves certain improvements in the construction of a receiving-instrument, whereby impulses of one polarity will actuate the indicator in one direction, and impulses of the opposite polarity in the opposite direction.

Figure 5:
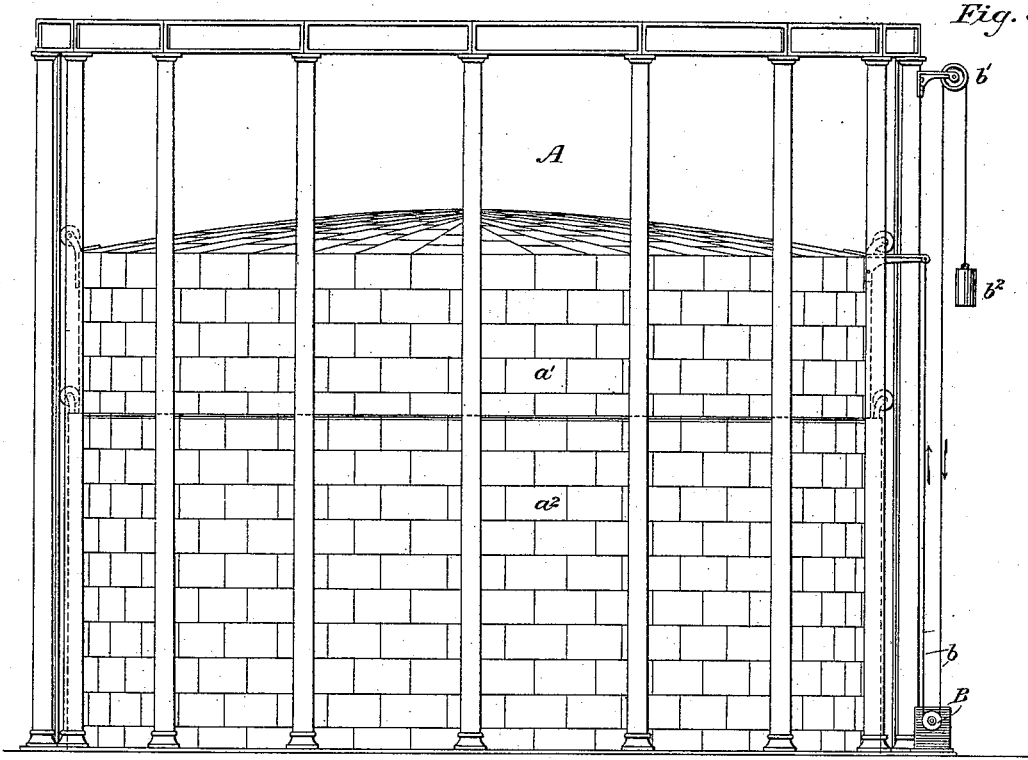
Figure 6:
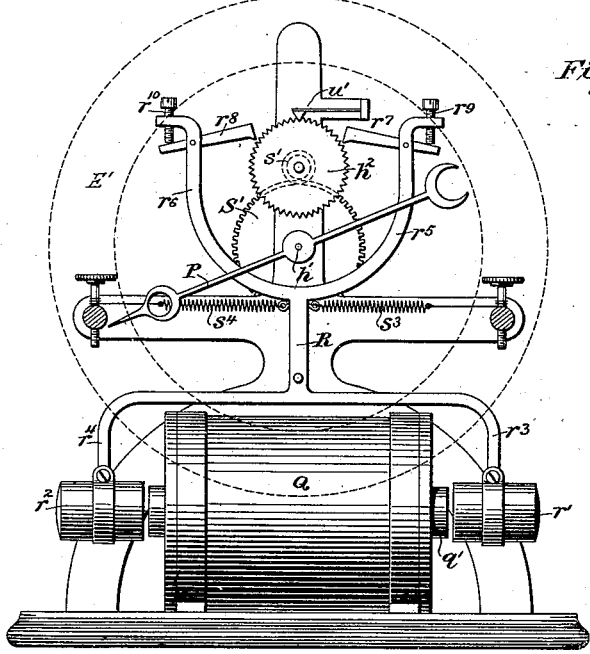

In the accompanying drawings, Figure 1 is a plan view of the transmitting and circuit-controlling apparatus, showing the receiving-instrument and the circuit-connections in diagram. Fig. 2 is a side elevation of the same, partly in section. Figs. 3 and 4 are transverse sections of the transmitter. Fig. 5 illustrates the organization of the gas-holder. Fig. 6 is an elevation of the receiving or indicating instrument. Figs. 7 and 8 illustrate certain details in the construction of the circuit-controlling devices.

Referring to the drawings, A represents a gas-holder of the usual form, which is constructed in this instance in two sections, $a'$ and $a^2$. The section $a^2$ extends beneath the surface of a reservoir of water in a manner well understood. The section $a'$ telescopes within the section $a^2$, a suitable joint being provided, which does not here require detailed description.

It is usual in the construction of these tanks or holders to make the capacities of the different sections very nearly the same; but yet the difference of diameter between the upper and the lower sections is too great to be disregarded. As the holder rises and falls by the supplying and exhausting of the gas, the shaft B is driven in a direction dependent upon the movement of the holder. This is accomplished by means of a cord, belt, or chain, $b$, which passes around a belt-wheel, B, upon the shaft C, and is carried over a pulley, $b'$. One end of the cord is secured to the holder, and the other carries a tension-weight, $b^2$. The wheel B is secured upon the shaft C by a spline, by which construction the shaft is allowed a longitudinal movement through the wheel, while the wheel itself is held laterally by its supports. This longitudinal movement is imparted to the shaft by a screw-thread, $b^5$, which, turning through a nut, $b^6$, causes the shaft to move in one direction or the other, according to the direction of movement of the wheel B, and thus of the gas-holder.

Upon the shaft C there are carried two toothed wheels, $c'$ and $c^2$. These are designed, respectively, to engage two pinions, $d'$ and $d^2$, carried upon a counter-shaft, D. When the holder is empty it is designed that the shaft C shall be in such position that the wheel $c'$ shall be in engagement with the outer end of the pinion $d'$, and as the shaft C is revolved by the ascending tank the wheel $c'$ will be carried longitudinally along the pinion, meanwhile revolving the counter-shaft D until it is at the end of the pinion $d'$. At this time the section $a'$ of the holder will have been filled, and the second section, $a^2$, will begin to rise. At this moment the wheel $c^2$ will engage the pinion $d^2$. The tooth of the two wheels and their respective pinions are such relatively to each other that the counter-shaft D will be revolved by them at a rapidity proportionate to the capacities of the sections $a'$ and $a^2$. In this manner a given rate of revolution will be imparted to the shaft D while the holder is being filled by supplying the gas to the first section, and a different rate when the gas is supplied to the second section.

For the purpose of readily bringing the wheels into engagement with their respective pinions at the proper moment without loss of motion, the teeth of the wheel $c'$ are cut away a portion of their length through a fraction of the circumference, as shown at $c^3$, and likewise the wheel $c^2$, as shown at $c^4$. Each wheel can thus pass beyond the end of the pinion corresponding thereto just before the other is freed from its pinion.

It is necessary for the purpose of operating the registering indicating instrument in the proper manner to note the quantity of gas contained in the holder, to transmit electric impulses corresponding in number and character to the movements of the holder as the gas is supplied to or removed from the same. To accomplish this the counter-shaft D is employed for revolving the two circuit-controlling devices, which will now be described. At the respective ends of the counter-shaft there are mounted two wheels, $d^3$ and $d^4$, each having a single tooth, $d$. These wheels are rigidly secured to the counter-shaft and revolve therewith. The purpose of the tooth $d$ upon the wheel $d^3$ is to couple the counter-shaft D with the circuit-controlling device when the holder is being supplied with gas, and to actuate it in the proper direction for transmitting impulses of the proper character for advancing the indicating device. Likewise the tooth $d$ upon the wheel $d^4$ is employed for the purpose of transmitting the proper impulses for moving the indicating device back when the gas is being withdrawn from the holder. For this purpose a pawl, $d^5$, is pivoted to a disk, $e'$, carried upon an axis concentric with the counter-shaft D, and this pawl is held by a spring, $e^3$, against the periphery of the toothed wheel $d^3$. When the counter-shaft is revolved by the filling of the holder, then the pawl $d^5$ engages the tooth $d$ at the proper moment, and the disk is advanced by the further revolution of the counter-shaft. Meanwhile the wheel $d^4$ is allowed to revolve without actuating a corresponding disk, $e^2$.

Upon the arbor $F'$ of the disk $e'$ there is mounted a cam, $f'$, which serves to operate the circuit-controlling devices for transmitting electric impulses of a given character—say, positive—to the receiving-instrument. The cam $f'$ is provided with two flanges, constituting in effect two additional cams, as shown at $f^2$ and $f^3$.

The purpose of the two outer cams last mentioned is to operate two circuit-controlling arms or levers, $H'$ and $H^2$, by respectively striking against the arm $h'$ of the lever $H'$ and a corresponding arm of the lever $H^2$. The forward movement of the cam causes these arms to move downward against the tension of suitable springs, $t^3$ and $t^4$, thereby raising the curved arms $h^3$ and $h^4$, which constitute contact-points, against which it is designed that two contact-springs, $i'$ and $i^2$, shall be caused to impinge when it is desired to complete the circuit-connections. The upward movement of these curved arms, however, raises the points from the path of the springs $i'$ and $i^2$. Meanwhile the revolution of the cam $f'$ has, by contact with an adjustable screw, $f^4$, raised two insulated contact-points or contact-levers, $k'$ and $k^2$, which are carried upon the arms $K'$ and $K^2$, respectively, away from the two yielding arms, $I'$ and $I^2$, upon which the springs $i'$ and $i^2$ are carried. The screw $f^4$ passes through a block, $m^2$, of insulating material, which is rigidly secured to the two arms, $K'$ and $K^2$. After the cam $f'$ has thus raised the contact-points $k'$ and $k^2$ out of the path of the insulated arms $I'$ and $I^2$, the further revolution of the cams $f^2$ and $f^3$ permits the contacts $h^3$ and $h^4$ to again fall into the path of and against the springs $i'$ and $i^2$. The points $k'$ and $k^2$ are held away from their corresponding contacts until a firm electrical connection has been thus formed between the arms $H'$ and $I'$, whereupon the segment or shoulder of the cam $f'$ passes beyond the screw $f^4$, and the levers $K'$ and $K^2$ are permitted to fall, thus first making an electrical connection with the arms $I'$ and $I^2$, and by their further descent forcing the springs $i'$ and $i^2$ away from their contact-points carried upon the ends of the curved arms. The arms $K'$ and $K^2$ are provided with springs $t'$ and $t^2$, respectively, for pressing them downward; though in some instances the force of gravity may be relied upon for this purpose. For the purpose of preventing a too rapid movement, and thus too short an electrical connection from being thus formed, a dash-pot, M, is preferably applied to the arms $K'$ and $K^2$. This is conveniently accomplished by pivoting a piston-rod, $m^3$, to an arm, $m'$, carried upon the insulated block $m^2$, which is secured to the arms $K'$ and $K^2$. Upon this rod is carried a piston, passing within the dash-pot $m^5$. The levers $H'$ and $H^2$ are independently supported, and thus are capable of movement independently of each other. They are also insulated from each other, for a purpose hereinafter set forth. After the cams have thus revolved and first raised the curved arms $H$ from the springs $i$, then, by lifting the points $k$, permitted the springs themselves to rise toward the arms, thereupon separating the points $k$ from the arms $I$, then permitting the arms $H$ to again fall into contact with the springs $i$, and subsequently permitting the points $k$ to fall against the arms $I$, thereby releasing the springs $i$ from connection with the arms $H$, then the operation is repeated by the still further advancement of the counter-shaft D.

The springs $i'$ and $i^2$, carried upon the arms $I'$ and $I^2$, are preferably constructed in the form shown in the drawings, and are curved so as to pass beyond suitable notches or projections formed at the extremities of the curved portions of the levers $H'$ and $H^2$, and they slide or rub against these projections, thereby securing a reliable electrical connection by keeping the surfaces bright and free from dust. The arms $I'$ and $I^2$ are supported by flexible springs, as shown at $i^5$, with reference to the arm $I'$, and these arms are fastened to insulating-blocks by suitable screws, which permit the arms to be moved forward and back to bring the springs $i'$ and $i^2$ into proper position relative to the arms $h^3$ and $h^4$. The arms $I'$ and $I^2$ normally tend to stand horizontally.

It is designed that the operation which has been described shall transmit electric impulses in a given direction over a main line, $L'$, to the receiving-instrument; and the means whereby this is accomplished will be hereinafter described.

Reference will now be made to the device employed for transmitting negative impulses when the gas is being exhausted from the holder for the purpose of operating the indicating device in the opposite direction. The disk $e^2$ which is applied to the wheel $d^4$ corresponds to the disk $e'$, already described; but its purpose, together with the corresponding pawl, $e^4$, is to revolve corresponding cams, $f^5$, $f^6$, and $f^7$, in the reverse direction when the counter-shaft D is revolved in the direction opposite to that referred to. To this end the pawl $d^6$ is constructed to engage the tooth upon the wheel $d^4$ and to thereby couple the same with the shaft $F^2$, which, like the shaft $F'$, is concentric with the counter-shaft D. The outer cams or flanges, $f^6$ and $f^7$, are applied to two insulated yielding arms, $H^3$ and $H^4$, and which correspond to the arms $H'$ and $H^2$. The arms $I^3$ and $I^4$ correspond to the arms $I'$ and $I^2$ and carry contact-springs $i^4$ and $i^5$, respectively, applied to the contacts or curved ends carried upon the levers $H^3$ and $H^4$. The operation of these several parts is precisely similar to that already described with reference to the forward movement of the counter-shaft and need not be repeated. It is evident, however, that some means must be provided for causing each circuit-controlling device to operate only when the counter-shaft D is moving in the proper direction. Thus, when it is advanced, the device controlled by the wheel $d^3$ should operate, and when it is returned toward its starting position then the device operated by the wheel $d^4$ should operate. This end of itself could be readily accomplished simply by causing the pawls $d^5$ and $d^6$ to engage their corresponding teeth, $d$, only upon one side; but it is necessary also that each disk and its corresponding circuit-controlling devices should be returned to a predetermined starting-point when the other circuit-controlling device commences to operate. To accomplish this it is necessary to employ two other pawls, $n'$ and $n^2$, which act upon the opposite sides of the teeth from the pawls $d^5$ and $d^6$. The pawl $n'$ is normally pressed toward the center of the disk $d^3$ and falls behind the tooth $d$ when the pawl $d^5$ engages the same. If, therefore, the counter-shaft D be advanced a fraction of a revolution, and before passing to the point at which it serves to transmit an impulse the counter-shaft should be moved in the opposite direction, so that a registering impulse would not be transmitted, then the pawl $n'$, being in engagement with the tooth $d$ of the wheel $d^3$, will turn the disk $e'$ backward, thereby returning the cams and the circuit-controlling arms to their starting-points. It is necessary, however, for two reasons, that the pawl $n'$ should at that moment be thrown out of engagement with the disk, and that the cam should be stopped at the moment it has been moved back to its starting-point, first, because it is necessary that the circuit-connections should be re-established through the corresponding contacts; and, second, because the shoulder of the cam $f'$ will strike against the screw or point $f^4$, which stands in its path, and a further movement of the shaft would thus be prevented unless the disk $d^3$ were uncoupled from the shaft F'. For the purpose of thus throwing the pawl $n'$ out of engagement, an arm, $n^3$, carrying a point, $n^5$, is employed. This point is preferably adjustable, and consists of a screw passing through the end of the arm $n^3$. This screw engages a tail, $n^7$, of the pawl $n'$ as the movement of the disk $e'$ brings the latter beneath the screw, and at the proper moment throws the pawl out of engagement with the tooth. The disk will thus be left at rest during any further backward movement of the shaft.

The arm $n^3$ is preferably mounted upon the insulating-block $m^2$, and it is thus raised from the tail of the pawl during the time the counter-shaft D is moving forward and turning the disk $e'$. It does not, therefore, operate the pawl at any other time than when it is desired to disengage it in the manner already described. In this manner it will be observed a very important result is accomplished—namely, the indicating device cannot be operated by a movement of the holder or by a change in the force which it is desired to measure or register less than one of the units corresponding to the completion of the electric circuit; for, if the counter-shaft be advanced any fraction of a revolution, the circuit-controlling devices will be returned to their starting-point by a reverse movement of the counter-shaft without transmitting an impulse, and the other circuit-controlling device meanwhile will stand at rest until the first-named device has been thus brought to its starting-point. A further movement of the counter-shaft in the reverse direction, however, will commence to operate the second circuit-controlling device, and will ultimately transmit an impulse accordingly, provided it completes a revolution.

Referring now to the diagram, O represents a battery, one pole of which is connected by a conductor, 1, with conductors 2 and 3, which respectively lead to arms H' and $K^3$. The negative pole is connected by conductors 4, 5, and 6, in like manner, with the arms $H^2$ and $K^4$, respectively. The arms K' and $H^4$ are respectively connected by conductors 7 and 8 with a main line, L, and the arms $K^2$ and $H^3$ are in like manner connected by conductors 9 and 10 with a conductor, 11, leading to the earth at $g'$. The main line L leads through the receiving-instrument, which will be hereinafter described, to the earth at $g^2$. It will be understood now by referring to the diagram that when the points $k'$ and $k^2$ are in contact with the springs I' and $I^2$ and the contact-springs $i'$ and $i^2$ are in connection with the arms or levers H' and $H^2$, respectively, then a circuit will be completed from the positive pole of the battery, through the conductors 1 and 2, the lever H', the arm I', lever K', the conductor 7, to the main line L, thence to the earth. At the same time the negative pole of the battery will be connected, through the conductors 4 and 5, lever $H^2$, spring-arm $I^2$, lever $K^2$, to the conductor 9 and line $l'$. In this manner a positive current will be sent to the main line. When, on the other hand, the other circuit-controlling device is operated, a negative current will be transmitted, the poles of the battery being reversed with reference to the main line. It is evident that a metallic circuit may be employed instead of the earth-connections at $g'$ and $g^2$, if it is desired.

The receiving, registering, or indicating instrument which it is preferred to employ consists of an indicating-arm, P, passing over a graduated scale or dial, E', constructed with its division-marks which constitute the various degrees which it is desired to indicate. The arm P is carried upon an arbor, $h'$, which also carries a toothed wheel, S', gearing with a pinion, $s'$, upon the arbor of a driving-wheel, $h^2$. The wheel $h^2$ is intended to be driven in one direction or the other, accordingly as a positive or a negative impulse is transmitted over the main line L. To this end an electromagnet, Q, is employed. This magnet preferably consists of a single helix surrounding a core $q'$.

To the respective ends of the magnet there are presented two permanent magnets, $r'$ and $r^2$, which constitute armatures for the same. These permanent magnets present corresponding poles, say north, to the confronting ends of the core of the electro-magnet, and they are supported upon arms $r^3$ and $r^4$ of a suitably pivoted lever or pendulum, R. The armatures are made adjustable in these arms to and from the poles of the magnet Q. When the magnet Q is vitalized by a positive current, the pendulum or lever R will be impelled in a given direction by the attraction exerted by one of its poles for the confronting permanent magnet or armature and the repulsion existing between the remaining pole and its confronting permanent magnet. A current in the reverse direction will produce the opposite effect.

Upon two arms, $r^5$ and $r^6$, respectively, of the pendulum there are carried two pawls, $r^7$ and $r^8$. These are rendered adjustable as regards their position with reference to the toothed wheel $h^2$ by means of two adjustable screws, $r^9$ and $r^{10}$, carried in the corresponding arms. The parts are so adjusted that when the instrument is at rest neither pawl will be in engagement with the wheel; but by a movement of the pendulum R in one direction one of the pawls will engage the wheel and advance it a space corresponding to one tooth, while a movement in the opposite direction from one point of rest will move the wheel in the opposite direction a corresponding distance. In this manner the pointer may be caused to advance or recede a predetermined distance by reason of each impulse transmitted over the main line.

For the purpose of rendering the instrument capable of measuring small fractions without employing a scape of too large dimensions, it is preferred to couple the toothed wheel $h^2$, to which the pawls are applied, with the arbor of the indicating-arm P, by means of suitable pinion, $s'$, and gear-wheel $S'$, the latter being carried upon the arbor of the pointer, as hereinbefore stated.

For the purpose of causing the pendulum R to stand normally in its central position with the respective armatures at equal distance from the corresponding poles of the magnet, suitable adjustable springs, $s^3$ and $s^4$, are employed. A suitable friction-spring, $u'$, is applied to the arbor of the driving-wheel to prevent it from being carried forward too far by its movement.

The coils of the magnet Q may be included directly in the circuit of the main line L; but in some instances it may be found desirable to operate the same by means of a local battery, the circuit-connections of which are controlled by a polarized relay in a manner well understood, and which does not require description.

I claim as my invention—

1. The combination, substantially as hereinbefore set forth, with a device moving in either of two directions under the influence of variations in pressure, temperature, or quantity, &c., of a shaft revolved thereby in a corresponding direction, a circuit-controlling device operated by the movement of said shaft in one direction to transmit electric impulses in a given direction, and an independent circuit-controlling device operated by the movement of said shaft in the opposite direction to transmit impulses in the direction opposite to that first named.

2. The combination, substantially as hereinbefore set forth, with a device responding to physical variations, of a shaft moving in one direction or the other correlatively with said variations, and two circuit-controlling devices governed by said shaft, the one of which is at rest while the other is being operated, and vice versa.

3. The combination, substantially as hereinbefore set forth, with a device responding to physical variations, of two independent circuit-controlling devices, and means, substantially such as described, for causing both to stand at a given point after one has been actuated before the other can be operated.

4. The combination, substantially as hereinbefore set forth, of a shaft revolving in either of two directions, a disk carried thereon, a circuit-controlling device consisting of the series of contact-points and the cam for operating the same, and a clutch device, substantially such as described, for coupling the shaft with the cam and causing it to operate said contact-points only when the shaft is driven in a given direction.

5. The combination, substantially as hereinbefore set forth, of a shaft, means for revolving the same in either of two directions, two circuit-controlling devices, two clutch devices for coupling said shaft with said circuit-controlling devices, respectively, one of which clutch devices advances the corresponding circuit-controlling device when the shaft is revolved in a given direction, and returns it to and leaves it in a given position when the shaft is revolved in the opposite direction, while the other clutch device operates its corresponding circuit-controlling devices in like manner when the shaft is revolved in the opposite direction.

6. The combination, substantially as hereinbefore set forth, of a shaft, means for actuating the same, a single-toothed wheel carried thereby, a disk concentric therewith, a pawl engaging the tooth of said wheel upon one side when said shaft is revolved in a given direction, thereby causing said disk to move with said shaft, a second pawl engaging said tooth upon the opposite side when said shaft is revolved in the opposite direction, means for releasing said tooth from engagement with the second pawl when the disk has been returned to a given position, and a circuit-controlling device operated by the movements of said disk.

7. The combination, substantially as hereinbefore set forth, of a battery, two insulated contact-points with which the opposite poles of said battery are connected, two contact-arms against which said points may be caused to impinge, respectively, a second pair of contact-arms to which the first pair are respectively applied, frictional connections between the same, electrical connections from the one of said second pair of arms with the earth and from the other through an electrically-operated instrument with the earth, and means, substantially such as described, for placing the arms of the one pair in contact with those of the other, respectively, and for subsequently placing the respective contact-points against the first-named pair of contact-arms, and thereby separating the respective contact-arms, substantially as described.

8. The combination, substantially as hereinbefore set forth, of two continuity-preserving keys, means, substantially such as described, for prolonging the contacts made thereby, means for operating either of said keys to the exclusion of the other, an indicating device responding to the operation of said keys, and means, substantially such as described, for preventing either key from operating except when the other is at rest in a given position.

9. The combination, substantially as hereinbefore set forth, of a shaft or arbor, a cam carried thereon and having projecting flanges, two contact-points controlled by said cam, two levers controlled by said flanges, intervening contact-arms for said levers and arms, and means, substantially such as described, whereby said levers may be moved out of the paths of said arms before said points are separated therefrom and placed in contact with said arms when said points have been removed from said arms, and means for subsequently placing said points in connection with said levers through said arms, and subsequently separating said arms from said levers.

10. The combination, substantially as hereinbefore set forth, of a gas-holder, a shaft revolved in one direction or the other accordingly as said holder rises or falls, a second shaft, two or more gear-wheel and pinion connections between said shafts, whereby rates of revolution may be imparted to the second shaft by the revolution of the first proportionate to the dimensions of the sections of the holder, and means, substantially such as described, for coupling said shafts through their different gears according to the positions of the holder.

11. The combination, substantially as hereinbefore set forth, of a gas-holder constructed in telescoping sections, a shaft operated by the movements of the holder, a screw-thread and nut for moving said shaft longitudinally, a second shaft, gear-connections between said shafts having different speeds, whereby the second shaft receives a rate of revolution from the movements of the gas-holder dependent upon the section being supplied or exhausted, a circuit-controlling device for transmitting impulses of a frequency and character dependent upon the rate and direction of revolution of the second shaft, and an indicating device responding to such impulses.

12. The combination, substantially as hereinbefore set forth, of a gas-holder constructed in sections, a shaft revolved thereby, a second shaft, multiplying-gears between said shafts of different speeds, each consisting of a pinion and a toothed wheel, the teeth of each of the latter being cut away throughout a portion of its periphery, substantially as described, and circuit-controlling devices operated by said second shaft.

13. The combination, substantially as hereinbefore set forth, in an apparatus for indicating or registering variations, of means for transmitting impulses in either of two directions, and a receiving-instrument consisting of an electro-magnet, two polarized armatures applied to its respective poles, a suspended lever carrying the same and normally holding both armatures away from the electro-magnet and permitting them to be moved from their position of rest in either direction, and a toothed wheel and pawls for actuating the same in one direction or the other by the movement of the lever.

14. The combination, substantially as hereinbefore set forth, with a device for transmitting impulses in a direction and with a frequency dependent upon variations which it may be desired to indicate, of a receiving-instrument consisting of an electro-magnet, two polarized armatures applied to the opposite poles of the same, respectively, a lever normally holding the same away from the electro-magnet and permitting them to move in either direction, two pawls carried by said lever, a toothed wheel, means for normally holding the pawls out of engagement with the wheel and for causing the one or the other to engage the same accordingly as said lever is moved in one direction or the other, and an indicating device actuated by said wheel.

In testimony whereof I have hereunto subscribed my name this 9th day of March, A. D. 1885.

MILTON W. GROVESTEEN.

Witnesses:
CAROLINE E. DAVIDSON,
CHARLES A. TERRY.